United States Patent Office 3,394,088
Patented July 23, 1968

3,394,088
PROCESS FOR THE POLYMERIZATION AND COPOLYMERIZATION OF ALKYLENE OXIDES
Walter Marconi and Alessandro Mazzei, San Donato Milanese, and Salvatore Cucinella, Milan, Italy, assignors to SNAM S.p.A., Milan, Italy, a company of Italy
Filed Jan. 5, 1965, Ser. No. 423,494
Claims priority, application Italy, Jan. 10, 1964, Patent 712,921
6 Claims. (Cl. 260—2)

ABSTRACT OF THE DISCLOSURE

There is disclosed a process for producing alkylene oxide polymers and copolymers of an alkylene oxide with another alkylene oxide such as allyl glycidyl ether where polymerization or copolymerization is effected in the presence of an aluminum compound as a catalyst, this compound having the general formula AlXYZ, X and Y being selected from the group consisting of hydrogen, halogens, and residues of secondary aliphatic and aromatic amines, and Z being a Lewis base type compound such as an ether or a tertiary amine, the Z compound not being present if X or Y is a secondary amine residue, the process being carried on at a temperature between $-20°$ C. and $100°$ C.

---

Figure 1:
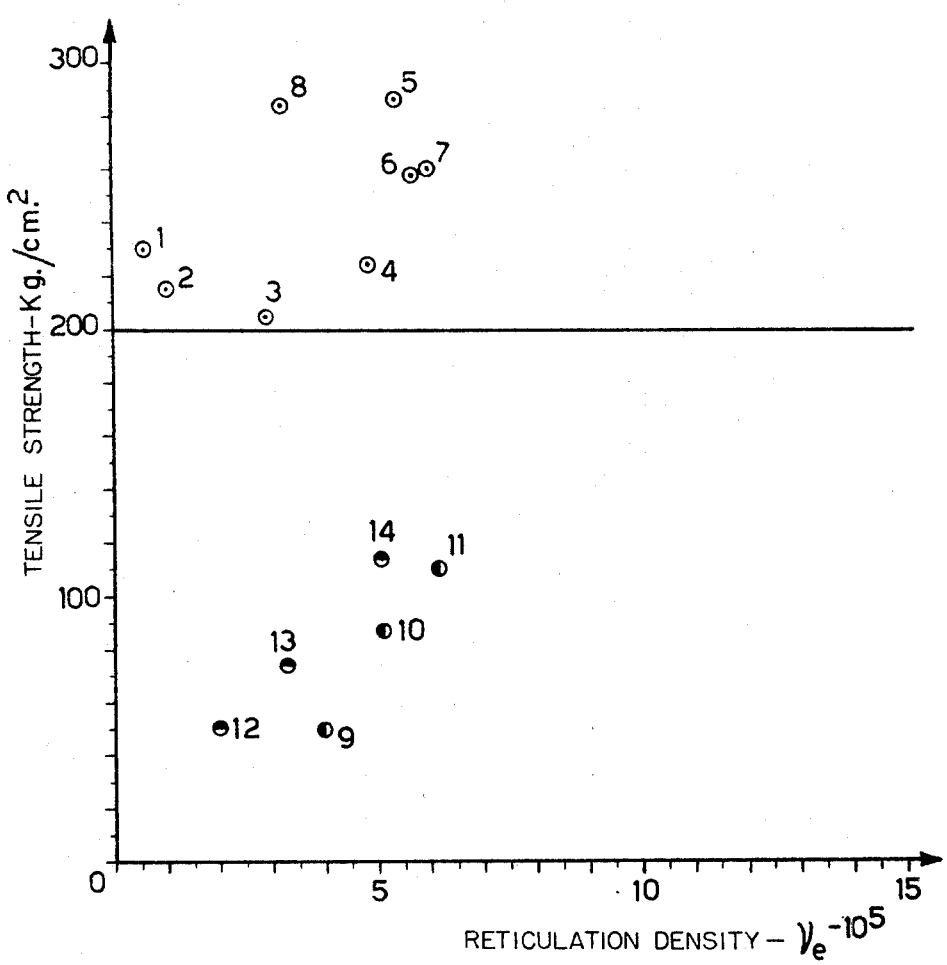

This invention relates to a process for the polymerization of alkylene oxides by employing aluminum hydrides as catalysts.

It is known in the art to polymerize alkylene oxides with catalysts selected from the group of organic metallic compounds such as aluminum alkyls, zinc alkyls and the like. In the majority of these processes there are obtained, however, products which exhibit an inadequate regularity in the chain structure and/or an exceedingly low molecular weight. The insufficient regularity of the chain structure does not allow elastomeric chains subjected to stresses to crystallize.

Consequently, the elastomer cannot attain the high mechanical properties of products which can be crystallized under traction, such as natural rubber. Such mechanical properties as tensile strength, tear resistance, cut growth resistance during repeatedly applied pressures, as a matter of fact, are very high, when no reinforcing fillers (such as carbon black, silica, a.s.o.) are present, only for crystallizable products.

It is known to those skilled in the art, however, that such a crystalization must be reversible, that is, when the deformation stress is removed the polymer is to exhibit an elastomeric behaviour. On the other hand, a sufficiently high molecular weight is of vital importance for a good elastomer. As a matter of fact, the "rubbery" resiliency is afforded by unrolling the polymeric chains and a limit to elongation is fixed by the length of the completely stretched chain. The greater is the chain length, the higher is the maximum elongation of the elastomer. The chain length, in these elastomers, is practically proportional to the molecular weight. Moreover, the presence of polymers having too low a molecular weight is conducive to a lowering of the yields and imposes the separation of the low polymers which cannot be commercially utilized, particularly as elastomers.

We have now found that it is possible to manufacture alkylene oxide polymers having a highly regular structure and a high molecular weight. This permits the obtention of vulcanized elastomers having very high mechanical properties (e.g. tensile strength) along with high reversible elongation, by employing inorganic-type catalysts which do not contain any direct Al to C bond, selected from the group of plain or substituted aluminium hydrides having the general formula:

$$Al.H.X.Y.Z$$

wherein X and Y, which can be equal or different, are selected from the group consisting of hydrogen, halogens, and residues of secondary aliphatic or aromatic amines, Z is a Lewis base, selected from the group of ethers or tertiary amines, which base can be dispensed with whenever X, and/or Y, stand for a secondary amine residue.

Aluminum hydrides can be employed concurrently with chelation agents of the kind of acetyl-acetone, bi-acetone-mono-oximes, dimethylglyoxime, acetonyl-acetone, etc. and, as the third component of the catalyst system also water could be employed.

As aluminum hydrides are exemplarily reported aluminum tri-hydride formed into a complex with ethers and amines, mono-chloro-, and bi-chloro aluminum hydride, mono-chloro-mono-amino aluminum hydride, dimethyl-amino aluminum di-hydride, piperidino aluminum di-hydride and the like.

With the catalyst systems of the present invention it is possible to polymerize unsubstituted allylene oxides as well as compounds containing an epoxide link and other functional groups. Suitable monomers are, for example, ethylene oxide, propylene oxide, butylene oxide, butadiene monoxide, vinyl glycidyl ether, allyl glycidyl ether, glycidyl acrylates, glycidyl methacrylate, epichlorohydrin.

More particularly copolymers and terpolymers are advantageous, in which at least one of the monomers contains, in addition to the oxide bond also an ethylenic unsaturation which makes them easily sulfur-curable according to the conventional techniques.

According to another aspect, in fact, the present invention relates also to particular copolymers comprising an alkylene oxide, preferably propylene oxide, along with small amounts of another alkylene oxide which also contains unsaturations and, among these latter, preferably allyl glycidyl ether.

The alkylene oxides indicated above are preferred owing to their availability on the market.

As a matter of fact, the vulcanized propylene-oxide-allyl glycidyl ether copolymer, when allyl glycidyl ether is contained therein in an amount such as to afford a sufficient number of vulcanizing spots and limited, on the other hand, to values such as not to hinder the crystallization under traction, exhibits mechanical properties which are definitely improved with respect to those obtained with the known methods. Without delving into the question, it is pointed out that such a favourable situation stems from the particular process of the present invention which allows the obtention of different products. Very presumably, such a process permits a particularly advantageous distribution of the units within the polymer mass and this accounts for the outstanding mechanical properties thereof. The different structure of the products of the present invention with respect to those of the prior art (obtained, for example, by resorting to catalyst systems which contain organic metallic compounds, i.e. direct metal to carbon bonds) can be made conspicuous with the aid of X-ray examination. On account of the importance possessed by the mechanical properties to the ends of the practical uses of said products, tests have been conducted, on the basis of said properties, for comparing a copolymer obtained according to the inventive process and the one obtained according to a known method which employed organic metallic compounds as the catalysts.

These tests have shown that, for copolymers exhibiting the same percentage of comonomers, those according to the present invention have tensile strength values (the reticulation densities being equal) and values of the stress as a function of the percent elongations which are definitely higher than those of the known art. More particularly, the inventive vulcanized elastomers are characterized by exhibiting tensile strength values not less than 200 kgs./sq. cms.

The obtention of high molecular weight polymers, according to the present invention, is, furthermore, particularly advantageous since they can be diluted, in the solution state or in the final polymer state, with suitable extenders, thus lowering the end cost of the elastomer without jeopardizing its satisfactory mechanical properties.

The polymerization reaction is preferably carried out in the presence of an inert thinner such as benzene, toluene, or aliphatic or cycloaliphatic hydrocarbons. The reaction temperature is usually between −20° C. and +100° C., preferably between 0° C. and 70° C.

When chelation agents are employed, the molar ratio of the chelating agent to the aluminum hydride ranges from 0.1 and 2.0, preferably between 0.5 and 1.5. When water also is employed, the molar ratio of water to the aluminum hydride ranges between 0.1 and 1.5, and preferably between 0.2 and 1.0.

The following examples illustrate the process of the invention, without however implying any limitation thereof.

Example 1

Propylene oxide is polymerized with $AlH_2N(CH_3)_2$.
The formulation is:

Toluene: 30 cu. cms.
$AlH_2N(CH_3)_2$: 7 millimols
Monomer: 10 cu. cms. (introduced into the bottle at −30° C.)
Temperature: 100° C. for 4 hours
Yield: 4.8 grs. of a high molecular weight polymer.

Example 2

Propylene oxide is polymerized with a catalyst system formed by $AlH_3N(CH_3)_3$ and acetyl acetone according to a molar ratio of 1:2.
The formulation is:

Toluene: 20 cu. cms.
Propylene oxide: 10 cu. cms.
$AlH_3N(CH_3)_3$: 6 millimols
Acetyl acetone: 12 millimols
Temperature: 100° C.; Time: 2 hrs.; Yield: 15%.

Polymerization was carried out in a bottle with a preformed catalyst obtained by reacting separately $$AlH_3N(CH_3)_3$$

with acetyl acetone at room temperature.

The polymer has a viscosity $[\eta]=4.93$ as determined in benzene at 25° C.

Example 3

Propylene oxide is polymerized with a catalyst system formed by $AlH_3N(CH_3)_3$, acetyl acetone and water according to a molar ratio of 1:1:0.5.
The formulation is as follows:

Toluene: 30 cu. cms.
$AlH_3N(CH_3)_3$: 6 millimols
Acetyl acetone: 6 millimols
Water: 3 millimols
Monomer: 10 cu. cms.
Temperature: 50° C.; Time: 16 hrs.; Yield: 61%.

The catalyst is prepared separately by adding dropwise, to the solution of $AlH_3N(CH_3)_3$ in toluene, and in the order given: acetyl acetone and water-saturated toluene. A fraction of the solvent is removed under vacuum and the catalyst is added to the monomer in a pressurized bottle.

The polymer has $[\eta]=10.20$ as determined in benzene at 25° C., and proves to be partially crystalline at X-ray examination.

Example 4

Epichlorohydrin (10 cu. cms. of monomer) is polymerized with the catalyst of Example 3 above.

After 16 hrs. at 50° C. there are obtained 1.8 grs. of a polymer which is crystalline at X-ray examination. M.P. 115° C.

Example 5

In this example a component of the catalyst has been replaced and the catalyst has the following composition: $AlH_3N(CH_3)_3$-acetonyl acetone-water in the molar ratio 1:0.5:0.5.
The formulation is:

Toluene: 20 cu. cms.
$AlH_3N(CH_3)_3$: 5.5 millimols
Acetonyl acetone: 2.25 millimols
Water: 2.25 millimols
Propylene oxide: 10 cu. cms.
Temperature: 50° C.; Time: 24 hrs.; Yield: 16%
$[\eta]=15.85$ in benzene at 25° C.

Example 6

In this example and in the following ones resort is had to the catalyst system formed by:

$AlH_3N(CH_3)_3$-diacetyl-mono-oxime in the molar ratio 1:1.

The procedure for this example and for the following ones is as follows: the catalyst is prepared separately by adding dropwise a solution of diacetyl-mono-oxime in toluene to a solution in toluene of $AlH_3N(CH_3)_3$ at room temperature. The solution is concentrated under vacuum and is transferred into a pressurized bottle, the monomer being subsequently introduced.

Ethylene oxide is polymerized according to the following formulation:

Toluene: 30 cu. cms.
$AlH_3N(CH_3)_3$: 7.6 millimols
$AlH_3N(CH_3)_3$ to acetyl oxime ratio=1
Ethylene oxide=9 grs.
Temperature: 50° C.; Time: 24 hrs.; Yield: 40%
$[\eta]=8.35$ as determined in benzene at 25° C.

A high crystallinity has been ascertained by X-ray examination.

Example 7

Propylene oxide is polymerized with the catalyst of the preceding example by using the following amounts of reagents:

Toluene: 30 cu. cms.
$AlH_3N(CH_3)_3=6$ millimols
$AlH_3N(CH_3)_3$ to acetyl oxime ratio=1
Propylene oxide=10 cu. cms.
Temperature=50° C.; Time: 16 hrs.; Yield=66%
$[\eta]=15.27$ as determined in benzene at 25° C.
Relative crystallinity: 24%.

Example 8

A copolymer is prepared between propylene oxide and allyl glycidyl ether, by employing the catalyst of Example 6. The respective amounts are as follows:

Toluene: 120 cu. cms.
$AlH_3N(CH_3)_3$: 29.92 millimols
$AlH_3N(CH_3)_3$ to acetyl oxime ratio=1
Propylene oxide: 42 cu. cms.
Allyl glycidyl ether: 2 cu. cms., corresponding to 4% b. wt.
Temperature: 30° C.; Time: 16 hrs.; Yield: 30%
$[\eta]=10$ as determined in benzene at 25° C.

The copolymer has been cured at 144.5° C. by using the compounds as tabulated below:

Toluene: 30 cu. cms.
$AlH_3N(CH_3)_3$: 6 millimols

TABLE I

| Test No. | Parts by weight | | | | | | Time of cure, mins. | Tensile strength, kgs./sq. cm. |
|---|---|---|---|---|---|---|---|---|
| | Polymer | Stearic Acid | ZnO | MBT | TMTD | Sulfur | | |
| 1 | 100 | 0.5 | 5 | 1 | 2 | 2 | 20 | 230 |
| 2 | 100 | 0.5 | 5 | 2 | 2.5 | 2.5 | 20 | 215 |
| 3 | 100 | 0.5 | 5 | 1 | 2 | 0.5 | 20 | 204 |

MBT=mercaptobenthiazole; TMTD=tetramethylthiuram disulphide.

Example 9

This example relates to the preparation of a polymer obtained by polymerizing propylene oxide-ethylene oxide-allyl glycidyl ether with the catalyst system $AlH_3N(CH_3)_3$-$CH_3CO$—$C(NOH)CH_3$ in the molar ratio 1:1. The formulation is the following:

Toluene: 30 cu. cms.
$AlH_3N(CH_3)_3$: 8 millimols
$CH_3$—$CO$—$C(NOH)$—$CH_3$: 8 millimols
Propylene oxide: 5 cu. cms.
Ethylene oxide: 4.5 grs.
Allyl glycidyl ether: 0.5 cu. cms.
Temperature: 50° C.; Time=16 hrs.; Yield: 23%
The polymer is amorphous at X-ray examination.

Example 10

A mixture of propylene oxide with butylene oxide and allyl glycidyl ether is polymerized with the catalyst system $AlH_3N(CH_3)_3$ and $CH_3$—$CO$—$C(NOH)$—$CH_3$ in the molar ratio 1:1 according to the following formulation:

Toluene: 30 cu. cms.
$AlH_3N(CH_3)_3$: 6 millimols
$CH_3$—$CO$—$C(NOH)$—$CH_3$: 6 millimols
Propylene oxide: 7.6 cu. cms.
Butylene oxide: 3 cu. cms.
Allyl glycidyl ether: 0.9 cu. cms.
Temperature: 50° C.; Time=79 hrs.; Yield=14%.

The polymer is amorphous at X-ray examination and is partially soluble in benzene (60% approx.). The soluble fraction has a $[\eta]=8.77$ at 25° C.

Example 11

Propylene oxide has been copolymerized with epichlorohydrin by employing the catalyst system $AlH_3N(CH_3)_3$ and $CH_3$—$CO$—$C(NOH)$—$CH_3$ according to the following formulation:

$CH_3$—$CO$—$C(NOH)$—$CH_3$: 6 millimols
Propylene oxide=8 cu. cms.
Epichlorohydrin: 2.3 cu. cms.
Temperature: 40° C.; Time: 32 hrs.; Yield=12.5%
$[\eta]=3.85$ in benzene at 25° C.

Example 12

Propylene oxide has been copolymerized with allyl glycidyl ether by adopting the following formulation:

Toluene: 200 cu. cms.
$AlH_3N(CH_3)_3$: 28.02 millimols
$AlH_3N(CH_3)_3$ to acetyl oxime ratio=1
Propylene oxide: 46 cu. cms.
Allyl glicidyl ether=1.72 cu. cms. corresp. to 4% b.wt.
Polymerization temperature: +80° C.; Time 5½ hrs.
Yield=30%.

The polymer thus obtained has been subjected to curing tests and the results are tabulated below.

TABLE II

| Test No. | Parts by weight | | | | | | Curing time, mins. | Tensile strength, kgs./sq. cm. |
|---|---|---|---|---|---|---|---|---|
| | Polymer | Stearic Acid | ZnO | MBT | TMTD | Sulfur | | |
| 4 | 100 | 0.5 | 5 | 1 | 2 | 1 | 20 | 224 |
| 5 | 100 | 0.5 | 5 | 1 | 2 | 1.5 | 20 | 286 |
| 6 | 100 | 0.5 | 5 | 1 | 2 | 2 | 20 | 258 |
| 7 | 100 | 0.5 | 5 | 1 | 2 | 2.5 | 20 | 260 |
| 8 | 100 | 0.5 | 5 | 0.5 | 1 | 1 | 20 | 284 |

Example 13

Propylene oxide has been copolymerized with allyl glycidyl ether according to conventional techniques by employing the catalyst system (zinc-diethyl)-water whereas the percentages of the monomers are just the same as those of Examples 8 and 12.

The copolymers thus obtained are cured according to the same method of the above cited examples and the results are tabulated below.

TABLE III

| Test No. | Parts by weight | | | | | | Curing time, mins. | Tensile strength, kgs./sq. cm. |
|---|---|---|---|---|---|---|---|---|
| | Polymer | Stearic Acid | ZnO | MBT | TMTD | Sulfur | | |
| 9 | 100 | 0.5 | 5 | 0.5 | 0.5 | 0.5 | 20 | 50 |
| 10 | 100 | 0.5 | 5 | 0.5 | 1 | 1 | 20 | 87 |
| 11 | 100 | 0.5 | 5 | 1 | 2 | 1.5 | 20 | 110 |

Propylene oxide has been copolymerized with allyl glycidyl ether according to conventional techniques by employing the catalyst system formed by aluminium-triisobutyl, and acetyl acetone whereas the percentages of the monomers are the same as those of Examples 8 and 12.

The copolymers thus obtained, when subjected to cure according to the same method of the above cited examples, give the results tabulated below.

TABLE IV

| Test No. | Parts by weight | | | | | | Curing time, mins. | Tensile strength, kgs./sq. cm. |
|---|---|---|---|---|---|---|---|---|
| | Polymer | Stearic Acid | ZnO | MBT | TMTD | Sulfur | | |
| 12 | 100 | 0.5 | 5 | 0.5 | 0.5 | 0.5 | 20 | 51 |
| 13 | 100 | 0.5 | 5 | 0.5 | 1 | 1 | 20 | 74 |
| 14 | 100 | 0.5 | 5 | 1 | 2 | 1.5 | 20 | 114 |

A comparative examination of the tensile values for the tests of the Examples 13 and 14 with respect to those of Examples 8 and 12 shows that, all the other conditions being equal, the inventive copolymers possess properties which are definitely improved over those of the prior art. Both from the qualitative and the quantitative point of view, the differences are made conspicuous by the accompanying drawings.

In the drawings:

FIGURE 1 is a plot showing that all the inventive copolymer samples fall within a range in which the tensile strength is above 200 kgs./sq. cm., whereas those of the prior and contemporary art are, all of them, below said value. In FIG. 1, the ordinates report the tensile strength in kgs./sq. cm., whereas the abscissae are representative of the reticulation density (a magnitude which is proportional to the number of sulfur bonds which are formed between the polymer chains). The numerals reported in the area between the ordinates correspond to the test numbers.

Figure 2:
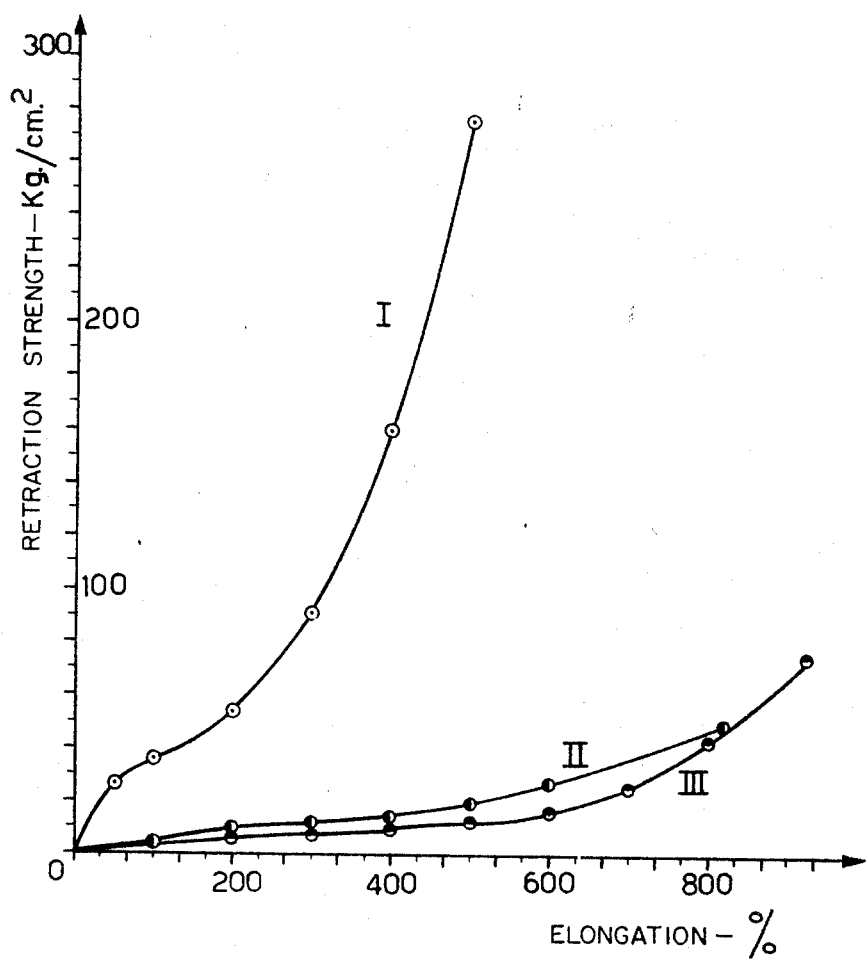

FIGURE 2 is a stress-strain plot which shows how the load which is necessary for rupturing the test piece (end point of the curve) is much higher in the case of the inventive polymers (curve I) as compared with those obtained according to the conventional techniques, i.e. curve II for Example 13, and curve III for Example 14. Said test pieces exhibited the same reticulation density. Moreover, the steeper slope of curve I makes the crystallization under traction of the inventive test piece fully conspicious.

To determine the reticulation density $v_e$, resort is had to swelling measurements (in equilibrium) in benzene at 23° C. by then applying the corrected Flory and Rehner formula (Dudek and Büche, Journal of Polymer Science, 2, 811 (1964)), wherein $v_e = 0.3716 - 0.1111\ V_r$.

What is claimed is:

1. A process for preparing polymers of alkylene oxides selected from the group consisting of ethylene oxide, propylene oxide, butylene oxide, butadiene monoxide, vinyl glycidyl ether, allyl glycidyl ether, glycidyl acrylate, glycidyl methacrylate, and epichlorohydrin, and copolymers of alkylene oxides selected from this group, which comprises contacting the monomers, at a temperature between −20° C. and 100° C. with a catalyst which is an aluminum compound having the general formula AlHXYZ, where X and Y are selected from the group consisting of hydrogen, halogens and residues of secondary aliphatic amines, and Z is a Lewis base compound selected from the group consisting of tertiary amines, the Z compound being absent when X or Y is a secondary amine residue.

2. A process according to claim 1, wherein polymerization is carried on in the presence of inert thinners selected from the group consisting of benzene, toluene, and aliphatic and cycloaliphatic hydrocarbons.

3. A process according to claim 1, wherein the catalyst includes, as a second component, a chelation agent selected from the group consisting of acetyl-acetone, biacetone-mono-oximes, dimethylglyoxime, and acetonylacetone, and the molar ratio of the chelation agent to the aluminum hydride ranges from 0.1 and 2.0.

4. A process according to claim 3, wherein water is used as a third component of the catalyst and the molar ratio of water to the aluminum hydride is between 0.1 and 1.5.

5. A process according to claim 3, wherein the molar ratio of the chelation agent to the aluminum compound is between 0.5 and 1.5.

6. A process according to claim 4, wherein the molar ratio of water to the aluminum compound is between 0.2 and 1.0.

References Cited
UNITED STATES PATENTS

| | | | |
|---|---|---|---|
| 2,895,922 | 7/1959 | Goddu | 260—20 |
| 2,895,931 | 7/1959 | Klug | 260—20 |
| 3,135,705 | 6/1964 | Vandenberg | 260—2 |
| 3,239,567 | 3/1966 | Kaufman | 260—2 |
| 3,245,976 | 4/1966 | Marconi et al. | 260—2 |

WILLIAM H. SHORT, *Primary Examiner.*

T. E. PERTILLA, *Assistant Examiner.*